No. 884,290. PATENTED APR. 7, 1908.
A. M. DE OCA.
LOCKING DEVICE.
APPLICATION FILED OCT. 11, 1907.
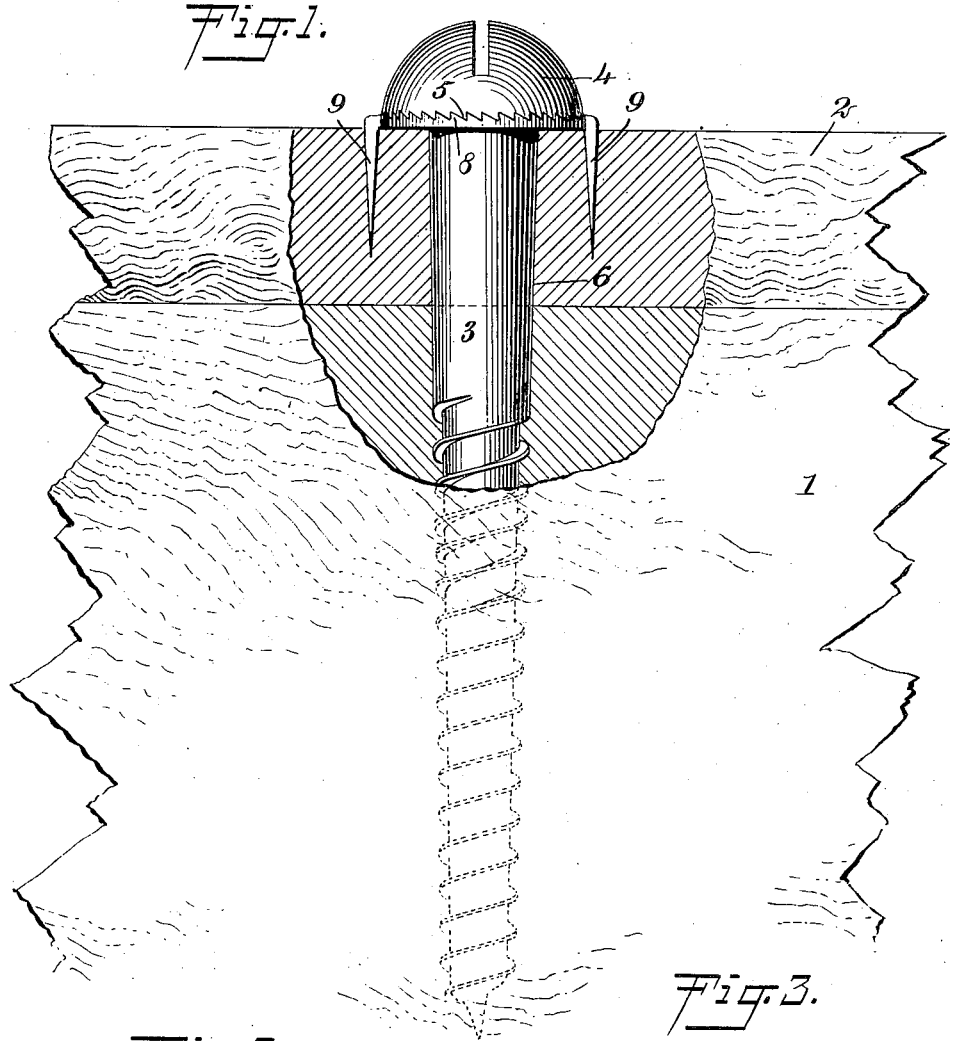
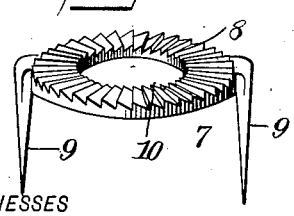
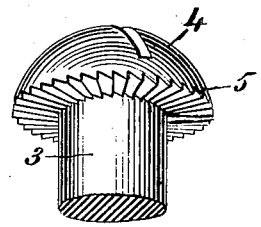
WITNESSES
INVENTOR
Agustin Montes de Oca
BY
ATTORNEYS

UNITED STATES PATENT OFFICE.

AGUSTIN MONTES DE OCA, OF MEXICO, MEXICO.

LOCKING DEVICE.

No. 884,290.    Specification of Letters Patent.    Patented April 7, 1908.

Application filed October 11, 1907. Serial No. 396,934.

*To all whom it may concern:*

Be it known that I, AGUSTIN MONTES DE OCA, a citizen of the Republic of Mexico, and a resident of Mexico, Mexico, have invented a new and Improved Locking Device, of which the following is a full, clear, and exact description.

This invention relates to locking devices, and is especially adapted for use in connection with screws for preventing their removal.

More specifically, the invention is intended to be used to prevent the perpetration of thefts by the removal of screws, the heads of which are exposed, as on the outer sides of doors or shipping cases, etc.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a portion of a shipping case to which the invention has been applied, certain parts being broken away and shown in cross section; Fig. 2 is a perspective of a locking ring which constitutes a feature of the invention; and Fig. 3 is a perspective showing the head and upper portion of the screw.

Referring more particularly to the parts, 1 represents the body of a box or shipping case, the same having a cover 2 which is held in place by a screw 3 constructed according to my invention. This screw has a body of ordinary form, but the under side of its head 4 is provided with a plurality of radially disposed ratchet teeth 5 which incline rearwardly with respect to the direction of rotation of the screw when it is advancing into the wood. Before the screw is placed in the hole 6 bored to receive it, I place over the body of the screw a locking ring 7 which is fully illustrated in Fig. 2. The body of this locking ring is of annular form and is provided on its upper face with a plurality of radially disposed ratchet teeth 8 which incline forwardly with respect to the direction of rotation of the screw when it is being advanced in the wood. These ratchet teeth 8 match the ratchet teeth 5, being of the same pitch and dimensions. At diametrically opposite points, the locking ring 7 is provided with parallel spurs 9 which are adapted to be driven into the outer face of the cover 2 before the screw seats itself, as indicated in Fig. 1.

The locking ring 7 has a central opening 10 which is of sufficiently large diameter to fit neatly on the body of the screw 3, so that the ring will be properly centered when driven into position as described. When the screw is seated, the ratchet teeth 5 on the under side of the head thereof engage with the ratchet teeth 8, as illustrated in Fig. 1, and effectually prevent the unscrewing of the screw.

Attention is called to the fact that the spurs 9 are offset, so that their butts are presented beyond the periphery of the locking ring. This construction materially facilitates the driving in of the spurs, as the blows of the hammer may be delivered upon the spurs without striking the teeth in their vicinity.

Having thus described my invention, I claim as new and desire to secure by Letters Patent:

1. A screw having a body and a head, an annular locking member adapted to be received under said head, said locking member having spurs on the under side thereof adapted to be driven inwardly in the direction in which the bolt or screw advances, and interlocking means between the under side of said head and said locking member, said spurs being offset beyond the periphery of said locking member to form a butt to receive hammer blows.

2. In combination, a screw having a head with a plurality of radially disposed ratchet teeth on the under side thereof, and a locking ring having a body with teeth on the upper face thereof adapted to engage said first teeth, and having spurs projecting in the direction of the body of the screw, said spurs being offset beyond the edge of said locking ring to form butts to receive hammer blows.

In testimony whereof I have signed my name to this specification in the presence of two subscribing witnesses.

AGUSTIN MONTES DE OCA.

Witnesses:
PEDRO ESCUDERO,
LUIS HELGUERA.